(12) United States Patent
Zhang et al.

(10) Patent No.: US 12,071,009 B2
(45) Date of Patent: Aug. 27, 2024

(54) VEHICLE-MOUNTED DISPLAY PANEL AND VEHICLE DEVICE

(71) Applicant: Wuhan China Star Optoelectronics Technology Co., Ltd., Hubei (CN)

(72) Inventors: Shoudong Zhang, Hubei (CN); Zheng Zhou, Hubei (CN); Suimang Song, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/297,531

(22) PCT Filed: May 19, 2021

(86) PCT No.: PCT/CN2021/094612
§ 371 (c)(1),
(2) Date: May 27, 2021

(87) PCT Pub. No.: WO2022/227141
PCT Pub. Date: Nov. 3, 2022

(65) Prior Publication Data
US 2024/0017611 A1    Jan. 18, 2024

(30) Foreign Application Priority Data
Apr. 28, 2021 (CN) .......................... 202110467088.8

(51) Int. Cl.
*G02B 27/01* (2006.01)
*B60K 35/00* (2006.01)
(Continued)

(52) U.S. Cl.
CPC .......... *B60K 35/00* (2013.01); *G02B 27/0149* (2013.01); *B60K 35/22* (2024.01);
(Continued)

(58) Field of Classification Search
CPC ............ G02B 27/0101; G02B 27/0149; G02B 2027/0161; G02F 1/133308; G02F 1/133342
See application file for complete search history.

(56) References Cited

U.S. PATENT DOCUMENTS 6,100,943 A     8/2000 Koide et al.
7,001,059 B2 *  2/2006 Han .................. G02F 1/133608
                                                          362/616
(Continued)

FOREIGN PATENT DOCUMENTS

CN        1496170        5/2004
CN      101706075        5/2010
(Continued)

*Primary Examiner* — Ryan D Howard

(57) ABSTRACT

A vehicle-mounted display panel and a vehicle device are provided. The vehicle-mounted display panel includes a backplate, a first display panel, and a second display panel. A first groove and a second groove are respectively defined on two opposite sides of the backplate. The first display panel and the second display panel are respectively mounted in the first groove and the second groove to improve integration of the first display panel and the second display panel, which is conducive to saving mounting space and realizes lightweight design of vehicles.

15 Claims, 10 Drawing Sheets

(51) Int. Cl.
*G02F 1/1333* (2006.01)
*B60K 35/22* (2024.01)

(52) U.S. Cl.
CPC ............... *B60K 2360/1526* (2024.01); *B60K 2360/336* (2024.01); *G02B 2027/0161* (2013.01)

(56) References Cited

U.S. PATENT DOCUMENTS

| | | | |
|---|---|---|---|
| 2003/0234897 A1* | 12/2003 | Ozawa | H04M 1/0245 349/65 |
| 2006/0028733 A1 | 2/2006 | Aoki et al. | |
| 2011/0141389 A1* | 6/2011 | Tabor | G02F 1/133615 349/58 |
| 2017/0343806 A1* | 11/2017 | Anzai | G02B 27/0101 |

FOREIGN PATENT DOCUMENTS

| | | |
|---|---|---|
| CN | 103676305 | 3/2014 |
| CN | 103901655 | 7/2014 |
| CN | 208141091 | 11/2018 |
| CN | 208444538 | 1/2019 |
| CN | 110095867 | 8/2019 |
| CN | 211528868 | 9/2020 |
| CN | 212569297 | 2/2021 |
| CN | 212647211 | 3/2021 |
| CN | 113219692 | 8/2021 |

\* cited by examiner

VEHICLE-MOUNTED DISPLAY PANEL AND VEHICLE DEVICE

RELATED APPLICATIONS

This application is a National Phase of PCT Patent Application No. PCT/CN2021/094612 having International filing date of May 19, 2021, which claims the benefit of priority of Chinese Patent Application No. 202110467088.8 filed on Apr. 28, 2021. The contents of the above applications are all incorporated by reference as if fully set forth herein in their entirety.

FIELD AND BACKGROUND OF THE INVENTION

The present application relates to the field of display technology and particularly to a vehicle-mounted display panel and a vehicle device.

Using liquid crystal display devices as liquid crystal instrument panels in cars to display instrument information has good practicability and operability. Equipping a head-up display (HUD) system in the cars allows drivers to see navigation, vehicle speed, and other information without turning or lowering their head, which improves driving safety. However, an independent design is adopted in current display devices equipped with both liquid crystal instrument panels and head-up display systems, which leads to lower integration of vehicle-mounted display panels and is not conducive to realizing lightweight designs of vehicles.

SUMMARY OF THE INVENTION

Embodiments of the present application provide a vehicle-mounted display panel and a vehicle device, which can remedy a problem of lower integration of first display panels and second display panels.

One embodiment of the present application provides a vehicle-mounted display panel, including a backplate, a first display panel, and a second display panel. A first groove and a second groove are respectively defined on two opposite sides of the backplate. The first display panel is mounted in the first groove. The second display panel is mounted in the second groove.

Optionally, in some embodiments of the present application, the backplate is a die-casting element.

Optionally, in some embodiments of the present application, from an overlooking perspective, a projection of the second groove on the first groove is located in a boundary of the first groove or overlaps the first groove.

Optionally, in some embodiments of the present application, the vehicle-mounted display panel further includes a first backlight module and a second backlight module. The first backlight module provides a backlight for the first display panel. The first backlight module includes the backplate. The second backlight module provides a backlight for the second display panel. The second backlight module and the first backlight module share the backplate.

Optionally, in some embodiments of the present application, each of the first backlight module and the second backlight module further includes edge-lit light sources and a light guide plate, the edge-lit light sources are located on a lateral wall corresponding to the first groove and the second groove, and the light guide plates are located on end walls corresponding to the first groove and the second groove and directly face the corresponding edge-lit light sources; or each of the first backlight module and the second backlight module further includes direct-lit light sources and a diffusion plate, the direct-lit light sources are located on the end walls corresponding to the first groove and the second groove, and each diffusion plate is located on a side of the direct-lit light sources away from the end walls.

Optionally, in some embodiments of the present application, the first groove includes a first sub-lateral wall, a second sub-lateral wall connected to the first sub-lateral wall, a third sub-lateral wall opposite to the first sub-lateral wall and connected to the second sub-lateral wall, and a fourth sub-lateral wall connected to the first sub-lateral wall and the third sub-lateral wall; the second groove includes a fifth sub-lateral wall, a sixth sub-lateral wall connected to the fifth sub-lateral wall, a seventh sub-lateral wall opposite to the fifth sub-lateral wall and connected to the sixth sub-lateral wall, and an eighth sub-lateral wall connected to the fifth sub-lateral wall and the seventh sub-lateral wall; from the overlooking perspective, an orthogonal projection of the fifth sub-lateral wall on the first groove overlaps the first sub-lateral wall or is located on a side of the first sub-lateral wall close to the third sub-lateral wall; and an orthogonal projection of the seventh sub-lateral wall on the first groove overlaps the third sub-lateral wall or is located on a side of the third sub-lateral wall close to the first sub-lateral wall; wherein the edge-lit light sources included by the first backlight module is located on the first sub-lateral wall, and the edge-lit light sources included by the second backlight module is located on the seventh sub-lateral wall.

Optionally, in some embodiments of the present application, the first backlight module further includes direct-lit light sources, the second backlight module further include edge-lit light sources, the edge-lit light sources are mounted on a lateral wall of the second groove, and the direct-lit light sources are mounted on an end wall of the first groove.

Optionally, in some embodiments of the present application, a depth of the first groove is greater than a depth of the second groove.

The present application further provides a vehicle device including a center console and a reflective device. The center console includes a center console body and the aforesaid vehicle-mounted display panel. The vehicle-mounted display panel is mounted on the center console body. The reflective device is configured to reflect light of the second display panel in a range of an eye-box.

Optionally, in some embodiments of the present application, the reflective device includes a front windshield being relatively oblique to the center console configured to reflect light of the second display panel in the range of the eye-box.

Optionally, in some embodiments of the present application, the reflective device further includes a concave mirror located in the center console body configured to reflect the light of the second display panel to the front windshield.

Compared to prior art, embodiments of the present application provide a vehicle-mounted display panel and a vehicle device. The vehicle-mounted display panel includes the backplate, the first display panel, and the second display panel. The first groove and the second groove are respectively defined on two opposite sides of the backplate. The first panel body is mounted in the first groove. The second panel body is mounted in the second groove to allow the first display panel and the second display panel to be mounted on one same backplate to improve integration of the first display panel and the second display panel. This is conducive to saving mounting space and realizes lightweight design of vehicles.

DESCRIPTION OF SPECIFIC EMBODIMENTS OF THE INVENTION

For making the purposes, technical solutions and effects of the present application be clearer and more definite, the present application will be further described in detail below. It should be understood that the specific embodiments described herein are merely for explaining the present application and are not intended to limit the present application.

Figure 1A:
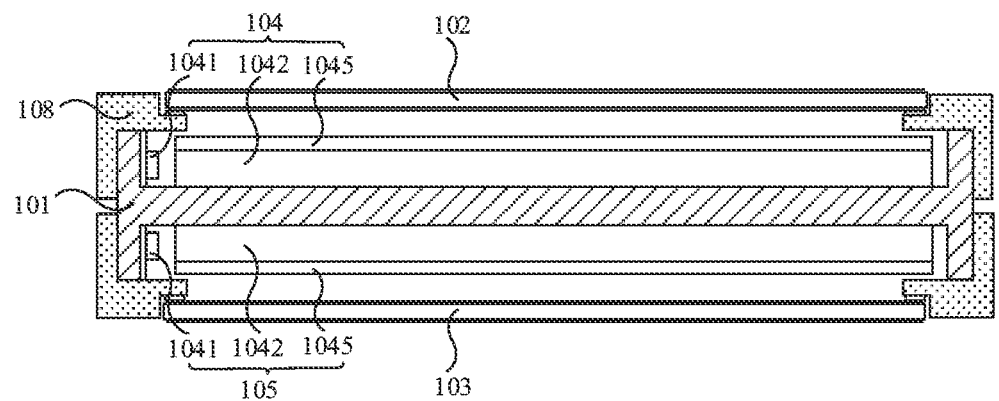
FIGS. 1A, 1B, 1C, 1D, 1E and 1F are structural schematic diagrams of a vehicle-mounted display panel provided by embodiments of the present application.
Figure 1B:
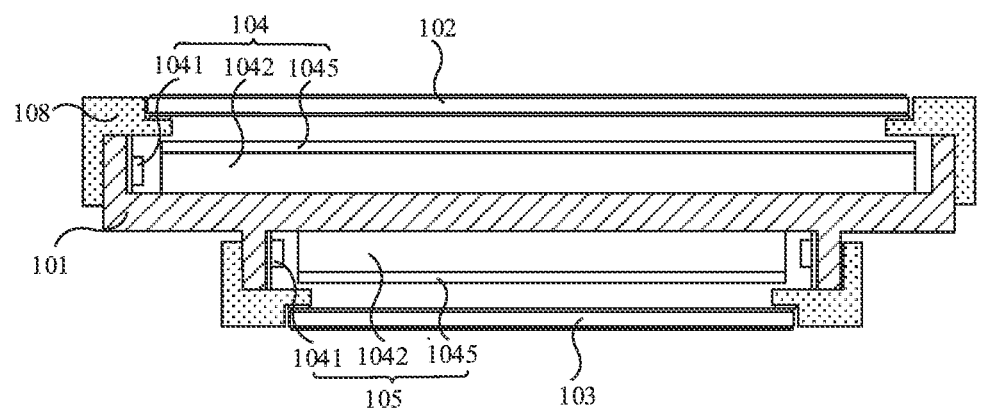
Figure 1C:
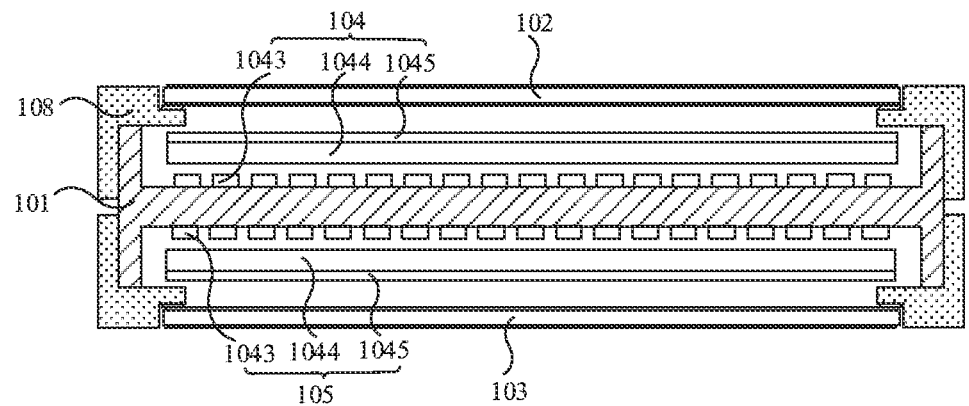
Figure 1D:
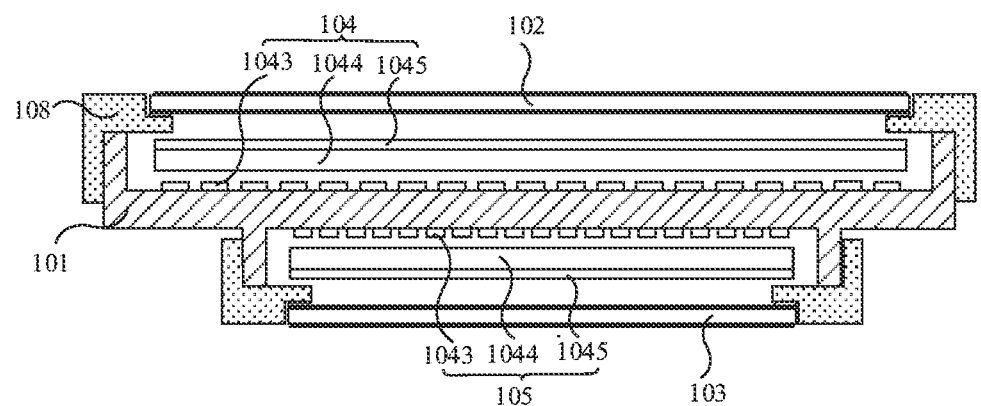
Figure 1E:
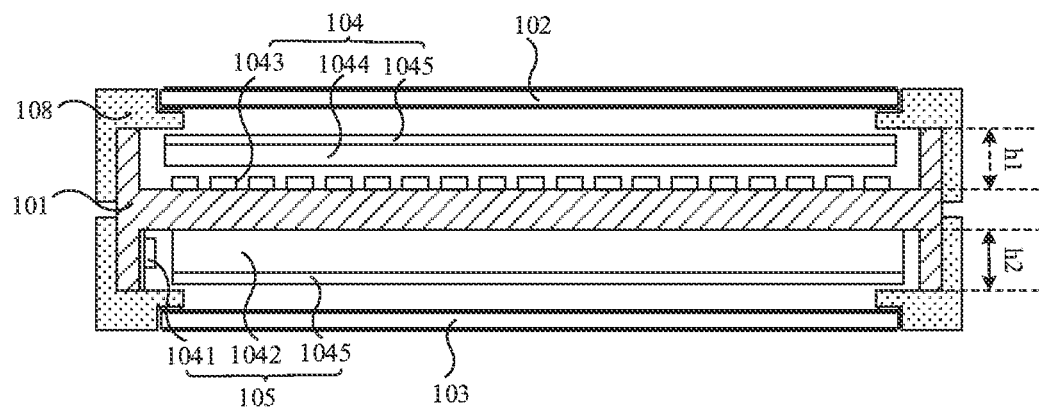
Figure 1F:
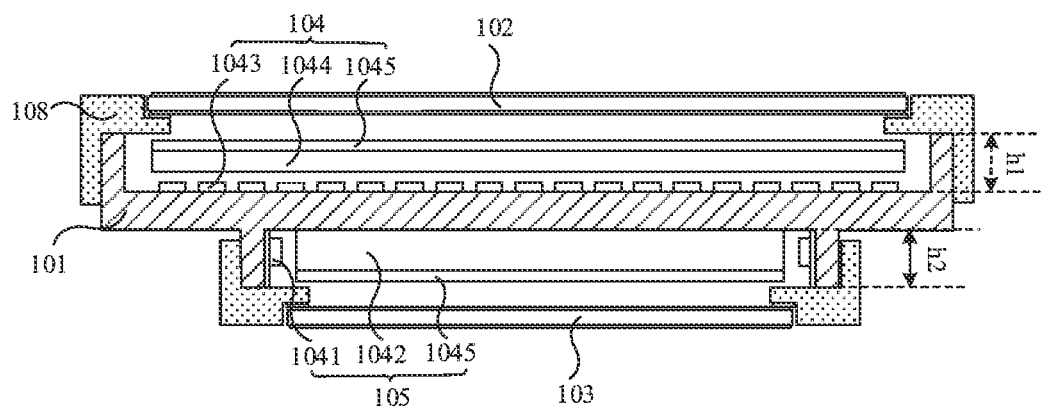
Figure 2A:
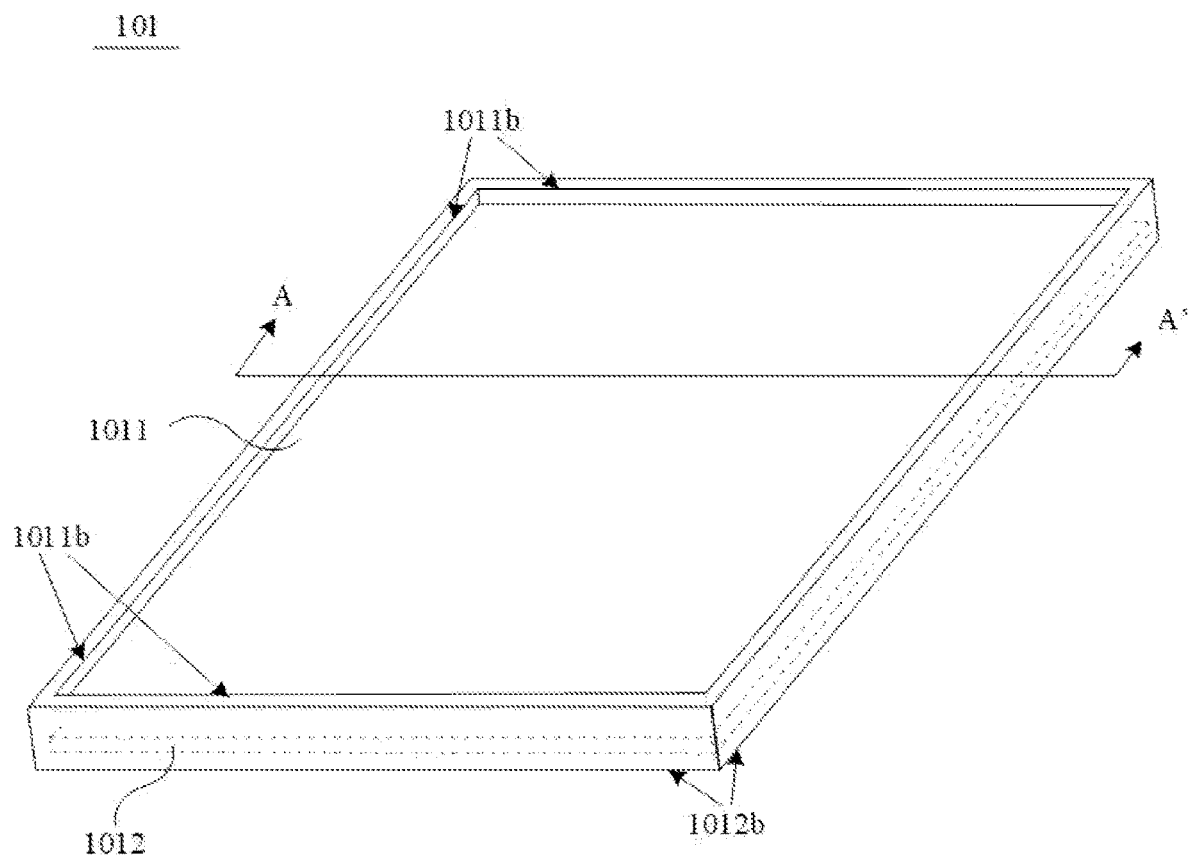
FIG. 2A to FIG. 2B are structural schematic diagrams of a backplate provided by embodiments of the present application.
Figure 2B:
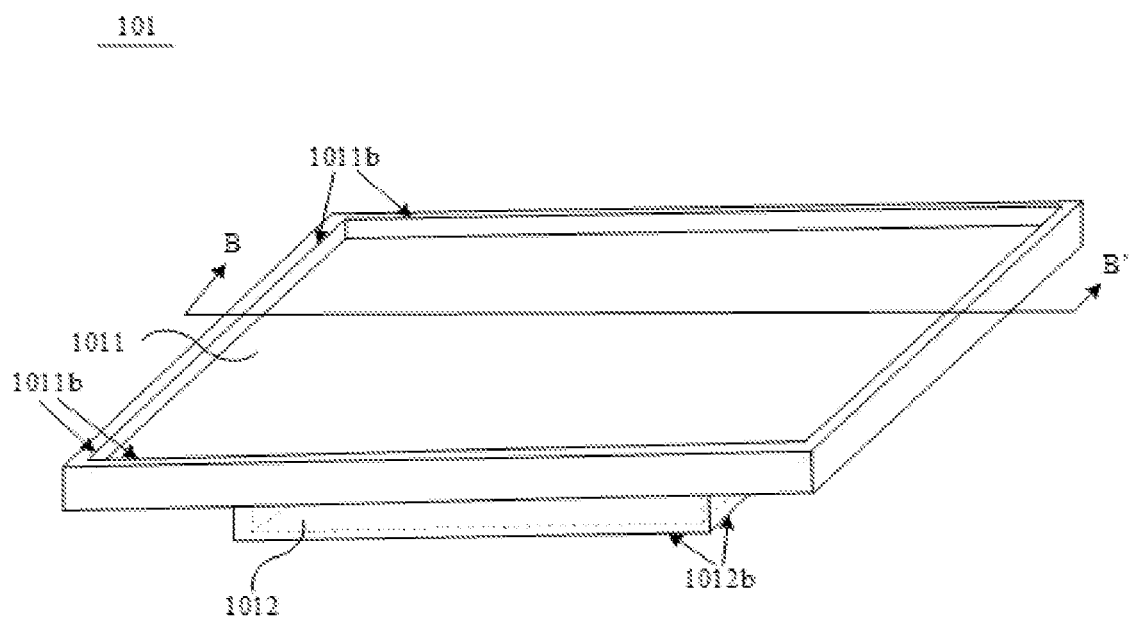

Specifically, please refer to FIG. 1A to FIG. 1F, which are structural schematic diagrams of a vehicle-mounted display panel provided by embodiments of the present application, and please refer to FIG. 2A to FIG. 2B, which are structural schematic diagrams of a backplate provided by embodiments of the present application. The present application provides a vehicle-mounted display panel. The vehicle-mounted display panel includes a backplate 101, a first display panel 102, and a second display panel 103.

Wherein, a first groove 1011 and a second groove 1012 are respectively defined on two opposite sides of the backplate 101; the first display panel 102 is mounted in the first groove 1011; and the second display panel 103 is mounted in the second groove 1012. By mounting the first display panel 102 and the second display panel 103 on one same backplate 101, integration design of the first display panel 102 and the second display panel 103 is realized, which improves integration of the first display panel 102 and the second display panel 103. Compared to a design method that the first display panel 102 and the second display panel 103 are mounted independently, a mounting space is advantageously saved, and mounting difficulty is lowered.

Optionally, the backplate 101 is a die-casting element. Compared to a sheet metal element or a stamping element of an aluminum sheet, the die-casting element has advantages of arbitrary molding, ease of assembly, better heat dissipation, and higher strength. Therefore, compared to designs of sheet metal elements or stamping elements of aluminum sheets of current backplates, the backplate 101 being the die-casting element is more conducive to satisfying design requirements, i.e., the first groove 1011 and the second groove 1012 are easily defined on the two opposite sides of the backplate 101, which is conducive to realizing assembly design of the first display panel 102 and the second display panel 103.

Furthermore, an orthogonal projection of the second groove 1012 directly facing an end wall of the first display panel 102 on an end wall of the first groove 1011 directly facing the second display panel 103 is located in a boundary of the first groove 1011 or completely overlaps the end wall of the first groove 1011.

Figure 2C:
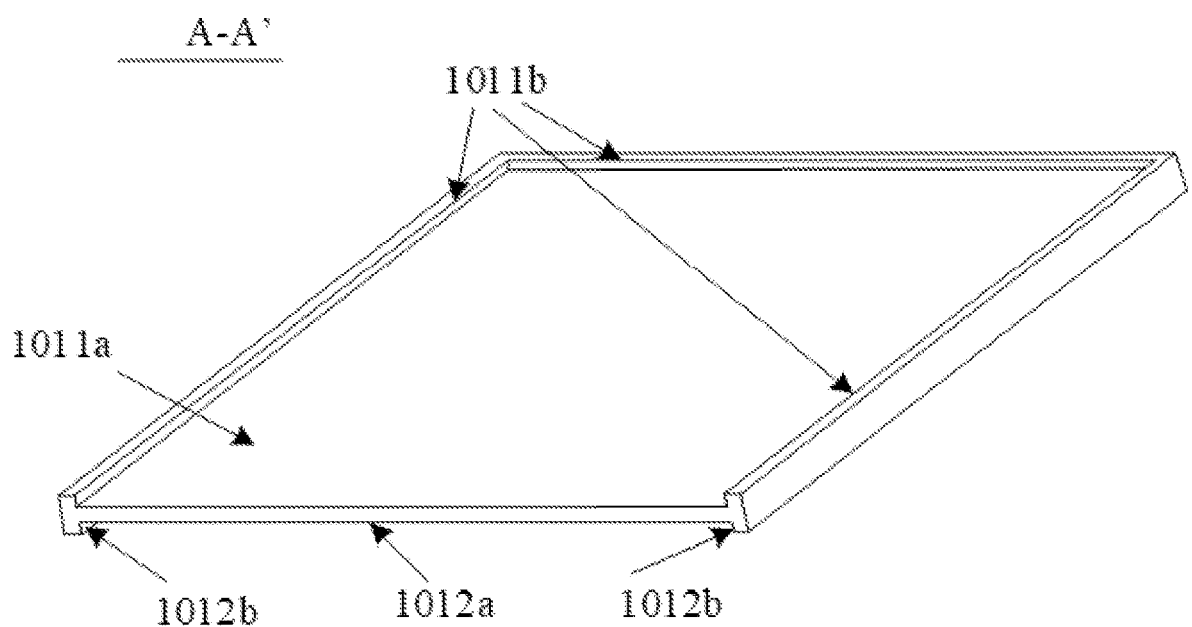
FIG. 2C is a cross sectional view along A-A' in FIG. 2A.
Figure 2D:
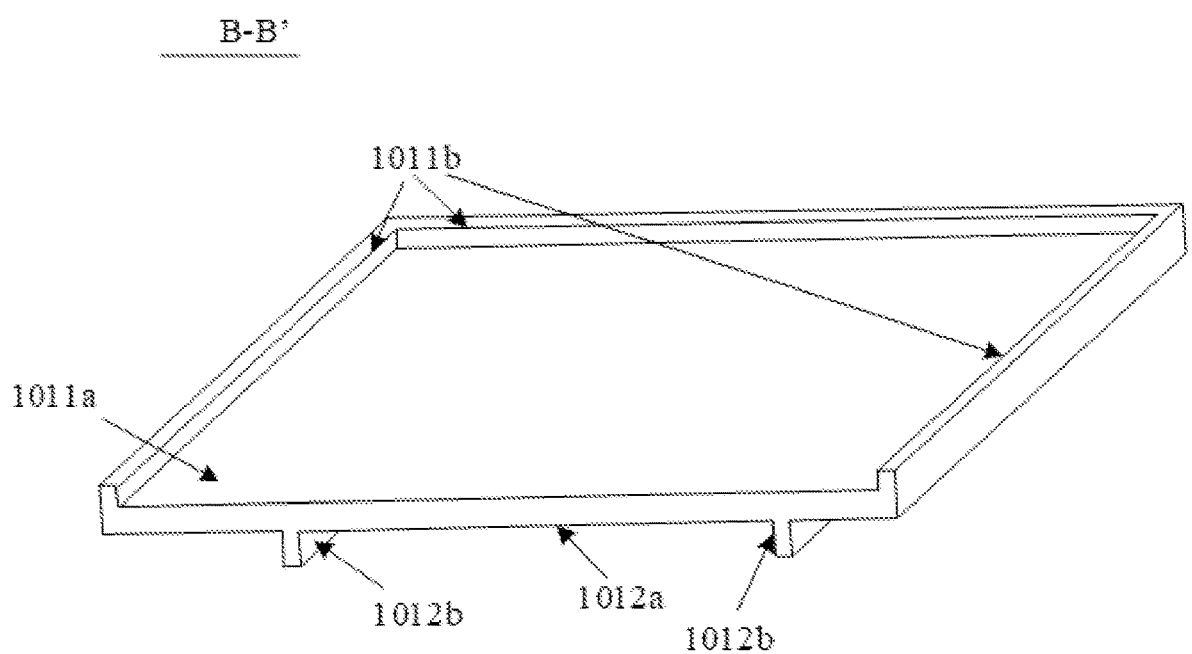
FIG. 2D is a cross sectional view along B-B' in FIG. 2B.

Specifically, FIG. 2C is a cross sectional view along A-A' in FIG. 2A, and FIG. 2D is a cross sectional view along B-B' in FIG. 2B. The first groove 1011 includes a first end wall 1011a and first lateral walls 1011b. The second groove 1012 includes a second end wall 1012a and second lateral walls 1012b. The first lateral walls 1011b are connected to the first end wall 1011a. The second lateral walls 1012b are connected to the second end wall 1012a. Wherein, the first end wall 1011a and the second end wall 1012a are disposed to directly face each other, thereby allowing the first end wall 1011a to directly face the second display panel 103 and allowing the second end wall 1012a to directly face the first display panel 102. As illustrated in FIG. 1B, FIG. 1D, FIG. 1F, and FIG. 2B, an orthogonal projection of the second end wall 1012a on the first end wall 1011a is located in a boundary of the first end wall 1011a, which allows the first groove 1011 and the second groove 1012 to have different sizes to satisfy different requirements of size designs; or as illustrated in FIG. 1A, FIG. 1C, FIG. 1E, and FIG. 2A, the orthogonal projection of the second end wall 1012a on the first end wall 1011a completely overlaps the first end wall 1011a, which allows the first groove 1011 and the second groove 1012 to have a same size and to reduce fabrication difficulty.

Optionally, the first lateral walls 1011b are perpendicularly connected to the first end wall 1011a, and the second lateral walls 1012b are perpendicularly connected to the second end wall 1012a.

Figure 3A:
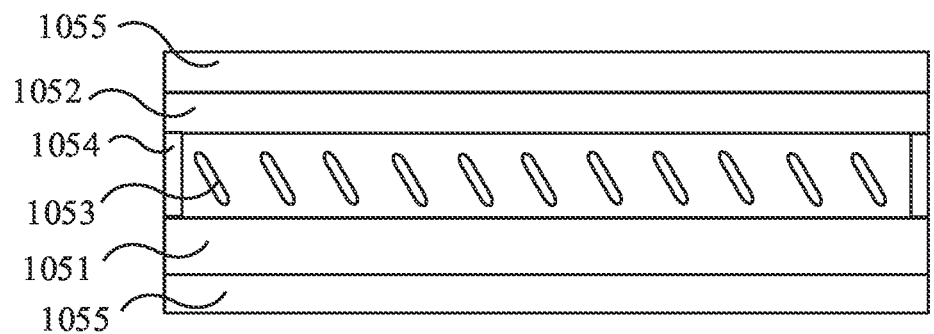
FIG. 3A to FIG. 3B are structural schematic diagrams of a first display panel or a second display panel provided by one embodiment of the present application.
Figure 3B:
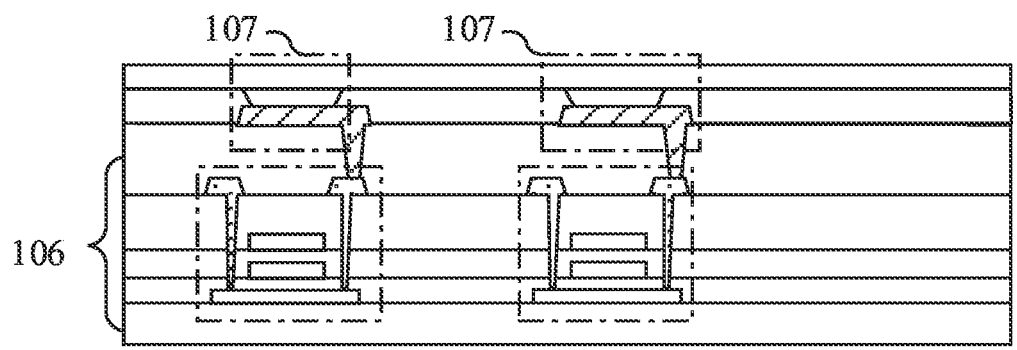

FIG. 3A to FIG. 3B are structural schematic diagrams of the first display panel 102 or the second display panel 103 provided by one embodiment of the present application.

Optionally, the first display panel 102 is used as a vehicle-mounted instrument display panel, and the second display panel 103 is used as a head-up display panel.

Optionally, displayed information of the first display panel 102 and the second display panel 103 are partially same. Specifically, the first display panel 102 is configured to display information such as vehicle speed, fuel consumption, etc., and the second display panel 103 is configured to display information such as navigation, vehicle speed, etc.

Optionally, full color display can be displayed on the first display panel 102, and full color display or black-and-white display can be realized on the second display panel 103. Compared to the design of full color display realized on the second display panel 103, the design of black-and-white display realized on the second display panel 103 can reduce design difficulty of the vehicle-mounted display panel and is conducive to reducing power consumption.

Optionally, resolutions of the first display panel 102 and the second display panel 103 are different. Furthermore, when displayed contents on the first display panel 102 are more plentiful than displayed contents on the second display panel 103, the resolution of the first display panel 102 is higher than the resolution of the second display panel 103. Wherein, by configuring the first display panel 102 and the second display panel 103 into different types, or by adjusting a distribution density of pixels of the first display panel 102 and the second display panel 103, etc., different resolutions of the first display panel 102 and the second display panel 103 are allowed to be realized. Specifically, the first display panel 102 is a self-luminous display panel, or the distribution density of the pixels of the first display panel 102 in a unit area is greater than a distribution density of the pixels of the second display panel 103 in a unit area.

Optionally, the types of the first display panel 102 and the second display panel 103 are same or different. Specifically, the first display panel 102 is a liquid crystal display panel or a self-luminous display panel, and the second display panel 103 is a liquid crystal display panel or a self-luminous display panel.

Please continue referring to FIG. 1A to FIG. 1F, FIG. 2A to FIG. 2D, and FIG. 3A. If the first display panel 102 and the second display panel 103 are liquid crystal display panels, the first display panel 102 includes a first panel body, and the second display panel 103 includes a second panel body. The vehicle-mounted display panel further includes a first backlight module 104 and a second backlight module 105. The first backlight module 104 is configured to provide a backlight to the first display panel 102. The second display panel 105 is configured to provide a backlight to the second display panel 103. Wherein, the first backlight module 104 includes the backplate 101, and the second backlight module 105 also includes the backplate 101, i.e., the first backlight module 104 and the second backlight module 105 share the backplate 101. By sharing the backplate 101, integration of the first backlight module 104 and the second backlight module 105 is improved.

Furthermore, types of the first backlight module 104 and the second backlight module 105 are same or different.

Specifically, the types of the first backlight module 104 and the second backlight module 105 are same. Each of the first backlight module 104 and the second backlight module 105 further includes edge-lit light sources 1041 and a light guide plate 1042. As illustrated in FIG. 1A and FIG. 1B, the edge-lit light sources 1041 are located on lateral walls corresponding to the first groove 1011 and the second groove 1012, i.e., the edge-lit light sources 1041 are located on the first lateral walls 1011b of the first groove 1011 and the second lateral walls 1012b of the second groove 1012, and the light guide plates 1042 are located on the end walls corresponding to the first groove 1011 and the second groove 1012 and directly face the edge-lit light sources 1041, i.e., the light guide plates 1042 are located on the first end wall 1011a of the first groove 1011 and the second end wall 1012a of the second groove 1012, and a side of the light guide plates 1042 corresponds to the edge-lit light sources 1041;

or each of the first backlight module 104 and the second backlight module 105 further includes direct-lit light sources 1043 and a diffusion plate 1044. As illustrated in FIG. 1C and FIG. 1D, the direct-lit light sources 1043 are located on end walls corresponding to the first groove 1011 and the second groove 1012, i.e., the direct-lit light sources 1043 are located on the first end wall 1011a of the first groove 1011 and the second end wall 1012a of the second groove 1012, each diffusion plate 1044 is located on a side of the direct-lit light sources 1043 away from the end wall, i.e., the diffusion plate 1044 is located on a side of the direct-lit light sources 1043 away from the first end wall 1011a of the first groove 1011, and the direct-lit light sources 1043 are located on a side of the direct-lit light sources 1043 away from the second end wall 1012a of the second groove 1012.

Optionally, numbers of the edge-lit light sources 1041 or the direct-lit light sources 1043 included by the first backlight module 104 and the edge-lit light sources 1041 or the direct-lit light sources 1043 included by the second backlight module 105 are different, so that power consumption of the vehicle-mounted display panel is allowed to be reduced without affecting display effect of the vehicle-mounted display panel.

Figure 2E:
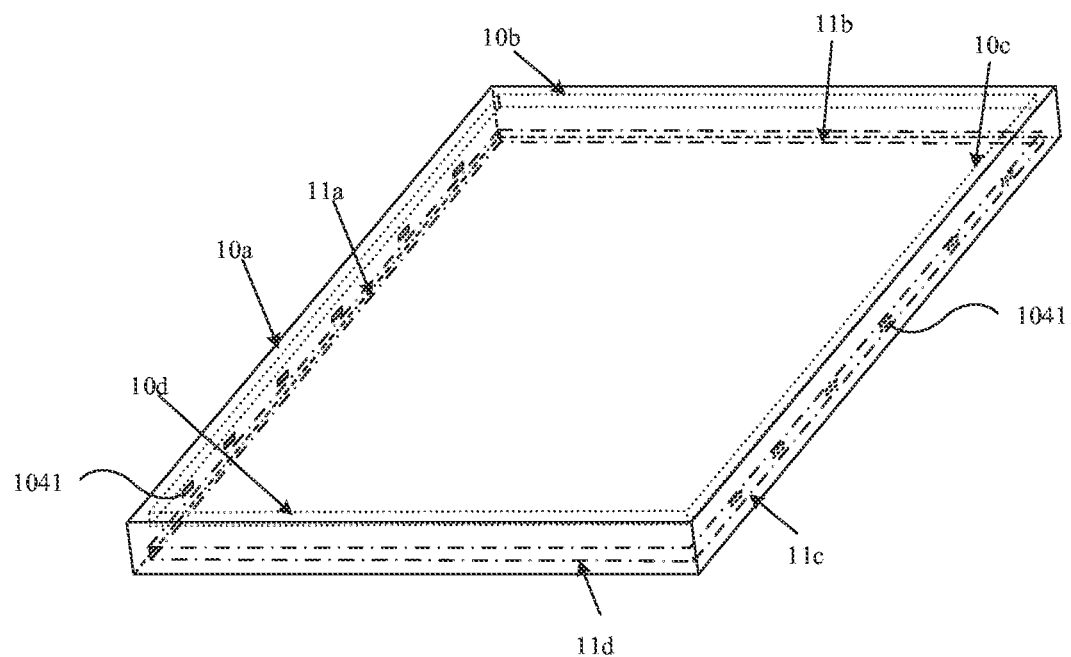
FIG. 2E is a schematic diagram of a mounting position of an edge-lit light source provided by one embodiment of the present application.

Optionally, FIG. 2E is a schematic diagram of a mounting position of the edge-lit light sources provided by one embodiment of the present application. The first lateral walls 1011b include a first sub-lateral wall 10a, a second sub-lateral wall 10b connected to the first sub-lateral wall 10a, a third sub-lateral wall 10c opposite to the first sub-lateral wall 10a and connected to the second sub-lateral wall 10b, and a fourth sub-lateral wall 10d connected to the first sub-lateral wall 10a and the third sub-lateral wall 10c. The second lateral walls 1012b include a fifth sub-lateral wall 11a, a sixth sub-lateral wall 11b connected to the fifth sub-lateral wall 11a, a seventh sub-lateral wall 11c opposite to the fifth sub-lateral wall 11a and connected to the sixth sub-lateral wall 11b, and an eighth sub-lateral wall 11d connected to the fifth sub-lateral wall 11a and the seventh sub-lateral wall 11c. From an overlooking perspective, an orthogonal projection of the fifth sub-lateral wall 11a on the first groove 1011 overlaps the first sub-lateral wall 10a or is located on a side of the first sub-lateral wall 10a close to the third sub-lateral wall 10c; an orthogonal projection of the sixth sub-lateral wall 11b on the first groove 1011 overlaps the second sub-lateral wall 10b or is located on a side of the second sub-lateral wall 10b close to the fourth sub-lateral wall 10d; an orthogonal projection of the seventh sub-lateral wall 11c on the first groove 1011 overlaps the third sub-lateral wall 10c or is located on a side of the third sub-lateral wall 10c close to the first sub-lateral wall 10a; and an orthogonal projection of the eighth sub-lateral wall 11d on the first groove 1011 overlaps the fourth sub-lateral wall 10d or is located on a side of the fourth sub-lateral wall 10d close to the second sub-lateral wall 10b. The edge-lit light sources 1041 included by the first backlight module 104 can be located on at least one of the first sub-lateral wall 10a, the second sub-lateral wall 10b, the third sub-lateral wall 10c, or the fourth sub-lateral wall 10d. The edge-lit light sources 1041 included by the second backlight module 105 can be located on at least one of the fifth sub-lateral wall 11a, the sixth sub-lateral wall 11b, the seventh sub-lateral wall 11c, or the eighth sub-lateral wall 11d. Furthermore, the edge-lit light sources 1041 included by the first backlight module 104 are located on the first sub-lateral wall 10a, and the edge-lit light sources 1041 included by the seventh sub-lateral wall 105 can be located on the seventh sub-lateral wall 11c, so that the edge-lit light sources 1041 included by the first backlight module 104 and the edge-lit light sources 1041 included by the second backlight module 105 are not allowed to overlap with each other, which is conducive to realizing heat dissipation of the edge-lit light sources 1041.

Furthermore, the greater the numbers of the edge-lit light sources 1041 or the direct-lit light sources 1043 there are, the better the display effect is. Therefore, the number of the edge-lit light sources 1041 or the direct-lit light sources 1043 included by the first backlight module 104 can be made to be greater than the number of the edge-lit light sources 1041 or the direct-lit light sources 1043 included by the second backlight module 105 to allow the display effect of the first display panel 102 to be better than the second display panel 103.

Please continue referring to FIG. 1E to FIG. 1F, FIG. 2A to FIG. 2D, and FIG. 3A. The types of the first backlight module 104 and the second backlight module 105 are different. One of the first backlight module 104 or the second backlight module 105 includes edge-lit light sources 1041 and the light guide plate 1042. Another one of the first backlight module 104 or the second backlight module 105 includes direct-lit light sources 1043 and the diffusion plate 1044.

Furthermore, the first backlight module 104 includes the direct-lit light sources 1043 and the diffusion plate 1044. The second backlight module 105 includes the edge-lit light sources 1041 and the light guide plate 1042. The edge-lit light sources 1041 are mounted on the lateral wall of the second groove 1012, i.e., the edge-lit light sources 1041 are mounted on the second lateral wall 1012b of the second groove 1012. The light guide plate 1042 is mounted on the second end wall 1012a of the second groove 1012 and a side of the light guide plate 1042 corresponds to the edge-lit light sources 1041. The direct-lit light sources 1043 are mounted on the end wall of the first groove 1011, i.e., the direct-lit light sources 1043 are mounted on the first end wall 1011a of the first groove 1011. The diffusion plate 1044 is mounted on a side of the direct-lit light sources 1043 away from the first end wall 1011a of the first groove 1011, which uses the direct-lit light sources 1043 to coordinate with local dimming technology to make display quality of the first display panel 102 be better than display quality of the second display panel 103. Furthermore, a depth h1 of the first groove 1011 mounted with the direct-lit light sources 1043 is greater than a depth h2 of the second groove 1012 mounted with the edge-lit light sources 1041, so a certain distance is allowed to exist between the direct-lit light sources 1043 located in the first groove 1011 and the first panel body. Therefore, light emitted from the direct-lit light sources 1043 can uniformly be projected the first panel body, which ensures the first display panel 102 to have a better display quality and to be conducive to lightweight design being realized on the vehicle-mounted display panel.

Optionally, the edge-lit light sources 1041 and the direct-lit light sources 1043 include light emitting devices. Furthermore, the light emitting devices include sub-millimeter light emitting diodes.

Optionally, the edge-lit light sources 1041 and the direct-lit light sources 1043 are fixed on the backplate 101 by heat conductive adhesive, and the light guide plate 1042 is interference fit with the backplate 101 by a rubber pad.

Furthermore, the first backlight module 104 and the second backlight module 105 further include optical layers 1045. Specifically, when the first backlight module 104 and the second backlight module 105 include edge-lit backlight sources 1041, the optical layers 1045 include diffusion films, luminance-enhancing films, etc.; when the first backlight module 104 and the second backlight module 105 include the direct-lit backlight sources 1043, the optical layers 1045 include luminance-enhancing films, etc., which allows to improve performances of brightness of light extraction and uniformity of the first backlight module 104 and the second backlight module 105.

Please continue referring to FIG. 1A to FIG. 1F and FIG. 3A. The first panel body and the second panel body both include array substrates 1051, color film substrates 1052, polarizer sheets 1055, liquid crystals 1053 located between the array substrates 1051 and the color film substrates 1052, and sealants 1054. Furthermore, the first panel body and the second panel body further include alignment layers, pixel electrodes, common electrodes, touch electrodes, etc., which are not shown in the figures.

Optionally, the liquid crystals 1053 include positive liquid crystals and negative liquid crystals. Display modes of the first display panel 102 and the second display panel 103 include a twisted nematic type, an in-plane transforming type, an in-plane switching type, a vertical alignment type, etc.

Furthermore, please continue referring to FIG. 1A to FIG. 1F. The vehicle-mounted display panel further includes a plastic frame 108. The plastic frame 108 is fixed on an outer side of the backplate 101. The plastic frame 108 includes a connection part and a supporting part. The connection part is fixed on the outer side of the backplate 101. The supporting part extends from a side of the connection part away from the first backlight module 104 and the second backlight module 105 toward a center of the backplate 101. The first display panel 102 and/or the second display panel 103 are connected to the supporting part by acrylic foam adhesives.

Optionally, types of the first display panel 102 and the second display panel 103 being different allows the first display panel 102 and the second display panel 103 to satisfy different display requirements. Specifically, one of the first display panel 102 or the second display panel 103 is a liquid crystal display panel, and another one of the first display panel 102 or the second display panel 103 is a self-luminous display panel.

Furthermore, the second display panel 103 is the liquid crystal display panel, and the first display panel 102 is the self-luminous display panel, which allows display effect of the first display panel 102 to be better than display effect of the second display panel 103.

Furthermore, please refer to FIG. 3B. The first display panel 102 includes a driving array 106 and a light emitting device 107 electrically connected to the driving array 106. Optionally, the light emitting device 107 includes organic light emitting diodes, sub-millimeter light emitting diodes, or micro light emitting diodes. It can be understood that the first display panel 102 can further include polarizer sheets, touch electrodes, sensors, etc., which are not shown.

It can be understood that the self-luminous display panel can emit light without using a backlight module. Therefore, when the first display panel 102 is the self-luminous display panel, the first display panel 102 can be mounted in the first groove 1011.

In addition, the first display panel 102 and the second display panel 103 can both be the self-luminous display panels. Furthermore, the first display panel 102 and the second display panel 103 are the self-luminous display panels of different types, which allows the first display panel 102 and the second display panel 103 to satisfy different display requirements. Optionally, the light emitting device of the first display panel 102 is the micro light emitting diodes or the sub-millimeter light emitting diodes, and the light emitting device of the second display panel 103 is the organic light emitting diodes.

Figure 4A:
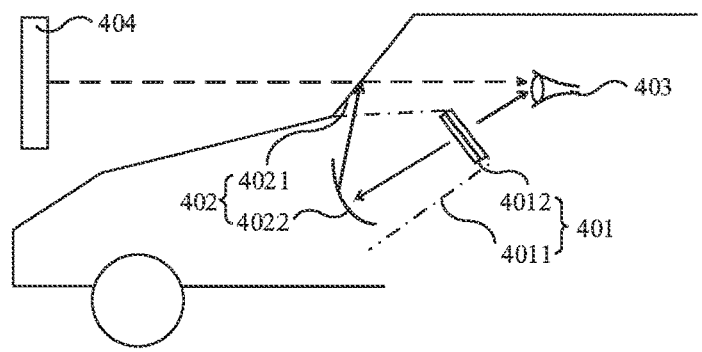
FIG. 4A is a structural schematic diagram of a vehicle device provided by one embodiment of the present application.
Figure 4B:
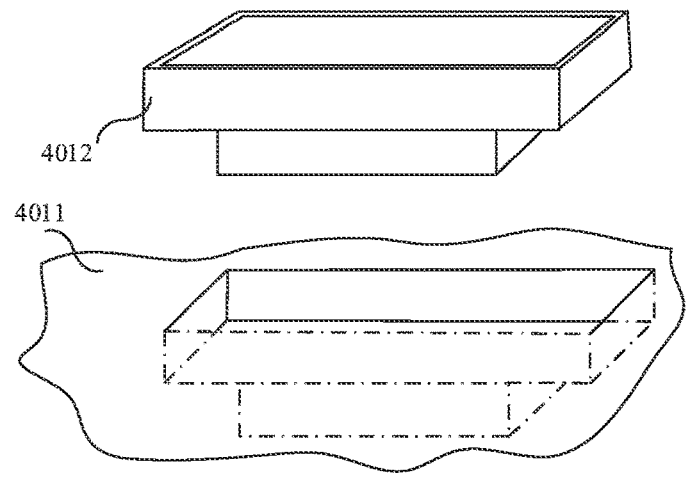
FIG. 4B to FIG. 4C are mounting schematic diagrams of the vehicle-mounted display panel and a center console body.
Figure 4C:
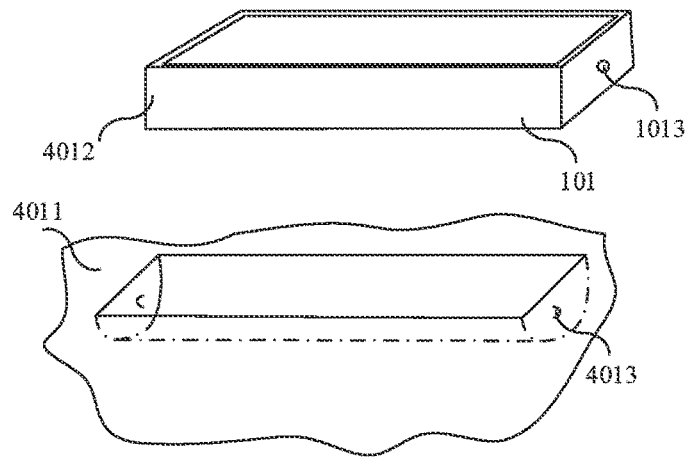

Please refer to FIG. 4A, which is a structural schematic diagram of a vehicle device provided by one embodiment of the present application. FIG. 4B to FIG. 4C are mounting schematic diagrams of the vehicle-mounted display panel and a center console body. The vehicle device includes any vehicle-mounted display panel mentioned above, wherein 4012 in FIG. 4A indicates the vehicle-mounted display panel. By integration design of the first display panel 102 and the second display panel 103, it is conducive to saving mounting space and realizes lightweight design of the vehicle device.

Specifically, the vehicle device includes a center console 401 and a reflective device 402. The center console 401 includes a center console body 4011 and the vehicle-mounted display panel 4012. The vehicle-mounted display panel 4012 is mounted on the center console body 4011. The reflective device 402 is configured to reflect light of the second display panel 103 in a range of an eye-box 403.

Wherein, the vehicle-mounted display panel 4012 can be fixedly mounted on the center console body 4011. For example, the vehicle-mounted display panel 4012 is fixedly mounted on the center console body 4011 by using a material such as adhesive, etc., or other structural forms such as buckles, pins, threads, etc., which allows the first display panel 102 to be disposed toward the eye box 403 and allows the second display panel 103 to be located in the center console body 4011. Optionally, as illustrated in FIG. 4B, the center console body 4011 has a structural device coordinating with the vehicle-mounted display panel 4012.

In addition, the vehicle-mounted display panel 4012 can be flipped on the center console body 4011 to realize flipping switch between the first display panel 102 and the second display panel 103, and the first display panel 102 or the second display panel 103 is allowed to be disposed toward the eye box 403. Therefore, when one of the first display panel 102 or the second display panel 103 is damaged, one of the first display panel 102 or the second display panel 103 which can display normally is allowed to directly face the eye box 403; or the one of the first display panel 102 or the second display panel 103 which can display normally is allowed to reflect light into the range of the eye box 403 by the reflective device 402.

Specifically, as illustrated in FIG. 4C, the backplate 101 further includes a rotational connection part 1013. The rotational connection part 1013 is located on two opposite sides of the backplate 101. The center console body 4011 includes a supporting connection part 4013 coordinating with the rotational connection part 1013. Therefore, when a flipping operation is performed, the first display panel 102 and the second display panel 103 are driven to realize flipping switch by rotation of the rotational connection part 1013 in the supporting connection part 4013. Optionally, the rotational connection part 1013 is a spherical convex structure, and the supporting connection part 4013 is a spherical concave structure; or the rotational connection part 1013 is a gear structure coordinating with the supporting connection part 4013, so the first display panel 102 and the second display panel 103 are driven to realize flipping switch by engagement of the gears.

Optionally, the rotational connection part 1013 is located on left and right sides of the backplate 101, and flipping switch between the first display panel 102 and the second display panel 103 is realized by operation of flipping up-and-down. Optionally, the rotational connection part 1013 is located on upper and lower sides of the backplate 101, and flipping switch between the first display panel 102 and the second display panel 103 is realized by operation of flipping left-and-right.

Please continue referring to FIG. 4A. The reflective device 402 includes a front windshield 4021 being relatively oblique to the center console 401 configured to reflect light of the second display panel 103 in the range of the eye-box 403.

Furthermore, the reflective device 402 further includes a reflective mirror 4022 located in an interior of the center console body 4011. The reflective mirror 4022 is configured to reflect the light of the second display panel 103 to the front windshield 4021. Wherein, the reflective mirror 4022 is a concave mirror.

Optionally, the light of the second display panel 103 can be directly reflected into the range of the eye box 403 by the front windshield 4021 and can also be directly reflected into the range of the eye box 403 by the reflective mirror 4022 and the front windshield 4021.

Specifically, when the first display panel 102 is disposed toward the eye box 403, the second display panel 103 emits light information, which can be directly projected on the front windshield 4021, and then the light information is reflected into the range of the eye box 403 by the front windshield 4021; or the light information emitted by the second display panel 103 is projected on the reflective mirror 4022, then the light information is reflected on the front windshield 4021 by reflection of the reflective mirror 4022, and then the light information is reflected into the range of the eye box 403 by the front windshield 4021.

Compared to the design of directly reflecting the light information into the range of the eye box 403 by using the front windshield 4021, adopting the design of reflecting the light information into the range of the eye box 403 by using the reflective mirror 4022 and the front windshield 4021 has a better imaging display effect, i.e., image information received in the range of the eye box 403 is clearer.

Because projected images 404 are located in front of the eye box 403, when a driver drives the vehicle device, the driver is allowed to look ahead, i.e., displayed information of the second display panel 103 is allowed to be received, and driving safety can be ensured.

It can be understood that a light transmission port configured for transmission and reflection of the reflective mirror 4022 is disposed on the center console body 4011, so that the light information reflected by the reflective mirror 4022 can be reflected to the front windshield 4021, and then the light information is reflected into the range of the eye box 403 by the front windshield 4021.

Optionally, the front windshield 4021 includes an optical film layer and glass located on two sides of the optical film layer, so that image information received in the range of the eye box 403 is allowed to be clearer. Furthermore, the optical film layer includes a polyvinyl butyral (PVB) film in a wedged shape, so that the front windshield 4021 is allowed to be in a shape of being thick at top and being thin at bottom.

This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A vehicle-mounted display panel, comprising:
   a backplate, wherein a first groove and a second groove are respectively defined on two opposite sides of the backplate;
   a first display panel mounted in the first groove; and
   a second display panel mounted in the second groove;
   wherein the vehicle-mounted display panel further comprises:

a first backlight module providing a backlight for the first display panel, wherein the first backlight module comprises the backplate; and a second backlight module providing a backlight for the second display panel, wherein the second backlight module and the first backlight module share the backplate;

wherein the first backlight module further comprises direct-lit light sources, the second backlight module further comprises edge-lit light sources, the edge-lit light sources are mounted on a lateral wall of the second groove, and the direct-lit light sources are mounted on an end wall of the first groove.

2. The vehicle-mounted display panel as claimed in claim 1, wherein the backplate is a die-casting element.

3. The vehicle-mounted display panel as claimed in claim 1, wherein from an overlooking perspective, a projection of the second groove on the first groove is located in a boundary of the first groove or overlaps the first groove.

4. The vehicle-mounted display panel as claimed in claim 1, wherein each of the first backlight module and the second backlight module further comprises edge-lit light sources and a light guide plate, the edge-lit light sources are located on a lateral wall corresponding to the first groove and the second groove, and the light guide plates are located on end walls corresponding to the first groove and the second groove and directly face the corresponding edge-lit light sources; or each of the first backlight module and the second backlight module further comprises direct-lit light sources and a diffusion plate, the direct-lit light sources are located on the end walls corresponding to the first groove and the second groove, and each diffusion plate is located on a side of the direct-lit light sources away from the end walls.

5. The vehicle-mounted display panel as claimed in claim 4, wherein the first groove is defined by a first end wall and first lateral walls perpendicularly connected to the first end wall, and the first lateral walls comprises comprise a first sub-lateral wall, a second sub-lateral wall connected to the first sub-lateral wall, a third sub-lateral wall opposite to the first sub-lateral wall and connected to the second sub-lateral wall, and a fourth sub-lateral wall connected to the first sub-lateral wall and the third sub-lateral wall; the second groove is defined by a second end wall and second lateral walls perpendicularly connected to the second end wall, and the second lateral walls comprises comprise a fifth sub-lateral wall, a sixth sub-lateral wall connected to the fifth sub-lateral wall, a seventh sub-lateral wall opposite to the fifth sub-lateral wall and connected to the sixth sub-lateral wall, and an eighth sub-lateral wall connected to the fifth sub-lateral wall and the seventh sub-lateral wall; from an overlooking perspective, an orthogonal projection of the fifth sub-lateral wall on the first groove overlaps the first sub-lateral wall or is located on a side of the first sub-lateral wall close to the third sub-lateral wall; and an orthogonal projection of the seventh sub-lateral wall on the first groove overlaps the third sub-lateral wall or is located on a side of the third sub-lateral wall close to the first sub-lateral wall; wherein the edge-lit light sources comprised by the first backlight module is located on the first sub-lateral wall, and the edge-lit light sources comprised by the second backlight module is located on the seventh sub-lateral wall.

6. The vehicle-mounted display panel as claimed in claim 5, wherein a depth of the first groove is greater than a depth of the second groove.

7. A vehicle device comprising a center console and a reflective device, wherein the center console comprises a center console body and a vehicle-mounted display panel, the vehicle-mounted display panel is mounted on the center console body, and the reflective device is configured to reflect light of the second display panel in a range of an eye-box;

wherein vehicle-mounted display panel comprises:
a backplate, wherein a first groove and a second groove are respectively defined on two opposite sides of the backplate;
a first display panel mounted in the first groove; and
a second display panel mounted in the second groove;
wherein the vehicle-mounted display panel further comprises:
a first backlight module providing a backlight for the first display panel, wherein the first backlight module comprises the backplate; and
a second backlight module providing a backlight for the second display panel, wherein the second backlight module and the first backlight module share the backplate;
wherein the first backlight module further comprises direct-lit light sources, the second backlight module further comprises edge-lit light sources, the edge-lit light sources are mounted on a lateral wall of the second groove, and the direct-lit light sources are mounted on an end wall of the first groove.

8. The vehicle device as claimed in claim 7, wherein the reflective device comprises a front windshield being relatively oblique to the center console to configured to reflect light of the second display panel in the range of the eye-box.

9. The vehicle device as claimed in claim 8, wherein the reflective device further comprises a concave mirror located in the center console body to configured to reflect the light of the second display panel to the front windshield.

10. The vehicle device as claimed in claim 8, wherein the front windshield comprises an optical film layer and glass located on two sides of the optical film layer.

11. The vehicle device as claimed in claim 10, wherein the optical film layer comprises a polyvinyl butyral film in a wedged shape.

12. The vehicle device as claimed in claim 7, wherein the backplate is a die-casting element.

13. The vehicle device as claimed in claim 7, wherein from an overlooking perspective, a projection of the second groove on the first groove is located in a boundary of the first groove or overlaps the first groove.

14. A vehicle device, comprising a center console and a reflective device, wherein the center console comprises a center console body and a vehicle-mounted display panel, the vehicle-mounted display panel is mounted on the center console body, and the reflective device is configured to reflect light of the second display panel in a range of an eye-box, wherein the vehicle-mounted display panel comprises:
a backplate, wherein a first groove and a second groove are respectively defined on two opposite sides of the backplate;
a first display panel mounted in the first groove; and
a second display panel mounted in the second groove;
wherein the backplate further comprises a rotational connection part, the rotational connection part is located on two opposite sides of the backplate close to the center console body, the center console body comprises a supporting connection part coordinating with the rotational connection part, and the rotational connection part rotates in the supporting connection part.

15. The vehicle device as claimed in claim 14, wherein the rotational connection part is a spherical convex structure, and the supporting connection part is a spherical concave structure; or the rotational connection part is a gear structure coordinating with the supporting connection part.

\* \* \* \* \*